United States Patent
Reim et al.

(10) Patent No.: US 6,798,140 B2
(45) Date of Patent: Sep. 28, 2004

(54) TIRE HAVING AN ELECTROLUMINESCENT DEVICE

(75) Inventors: Kevin R. Reim, Simpsonville, SC (US); Jack H. Thiesen, Easley, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/336,158

(22) Filed: Jan. 3, 2003

(65) Prior Publication Data

US 2004/0130272 A1 Jul. 8, 2004

(51) Int. Cl.[7] .......................... H01K 7/00; B60C 19/08; B60Q 1/12
(52) U.S. Cl. ............................. 315/76; 315/77; 362/42; 152/152.1
(58) Field of Search ................................. 315/169.3, 76, 315/77; 362/34, 42, 487, 509, 549, 84, 473; 313/511; 152/152.1, 367

(56) References Cited

U.S. PATENT DOCUMENTS

| | | | | | |
|---|---|---|---|---|---|
| 5,548,274 A | * | 8/1996 | Anderson et al. | ........... | 340/468 |
| 5,566,384 A | * | 10/1996 | Chien | ........... | 362/486 |
| 5,876,108 A | * | 3/1999 | Chien | ........... | 362/35 |
| 5,945,911 A | * | 8/1999 | Healy et al. | ........... | 340/573.1 |
| 6,176,603 B1 | * | 1/2001 | Spicer | ........... | 362/500 |
| 6,688,353 B1 | * | 2/2004 | Koch | ........... | 152/152.1 |
| 2004/0042200 A1 | * | 3/2004 | Hurwitz | ........... | 362/84 |

* cited by examiner

Primary Examiner—Thuy Vinh Tran
(74) Attorney, Agent, or Firm—Martin Farrell; Felipe Farley; E. Martin Remick

(57) ABSTRACT

A tire having an electroluminescent device includes an electroluminescent lamp, a driver, and a power supply including a piezoelectric fiber matrix for pulsing the device to flash and for generating power to energize the device. The device may be integrated in a rubber patch that is mounted to the tire sidewall, cured to the tire sidewall, or mounted in a recess or other prepared location.

15 Claims, 3 Drawing Sheets

TIRE HAVING AN ELECTROLUMINESCENT DEVICE

BACKGROUND AND SUMMARY

The invention relates to electroluminescent lamp devices, and more particularly, to electroluminescent lamp devices attached to tires of vehicles.

Electroluminescent lamps are known in various forms, including flat panels and wires, and have been proposed for a variety of products, including watches, instrument panels, vehicle body moldings, brake light displays, and athletic shoes.

For example, U.S. Pat. No. 6,037,865 to Heinz et al. discloses an electroluminescent band incorporated in molding attached to the outer surface of a vehicle body and U.S. Pat. No. 5,611,621 discloses electroluminescent lamps attached to a basketball shoe.

The invention relates to a use of electroluminescent (EL) lamps on tires, which may be ornamental or decorative, or may be used to improve visibility of the vehicle. An EL lamp in accordance with the invention may be a thin sheet or panel EL lamp made in the form of a logo or trademark, or a decorative shape, on the tire sidewall. Also, a wire EL lamp could be attached in a decorative or ornamental way. A wire EL lamp could also be shaped to spell a trademark. Other EL lamp devices could be used in similar ways.

According to the invention, an EL device for a tire includes an EL lamp, a power supply, a control device, and means for mounting or interfacing the EL device to a tire.

According to a preferred embodiment, the EL device includes a rubber patch to retain the EL lamp and power storage device. The patch may have a recess in which the EL lamp is mounted. The control electronics may be cured into a portion of the patch. An adhesive strip is provided on the side of the patch opposite from the recess for securing the patch to the sidewall of a tire.

A thin battery and the control electronics may be attached to the EL lamp to form a package, that may be readily mounted directly to a tire sidewall or installed in a patch as described above. For convenience, the package may be removable to allow for recharging of the battery and later remounting. In addition, the package may be removable and replaceable to allow change of EL lamp designs.

According to another aspect of the invention, the means for mounting the EL lamp to a tire may include a layer of a material for mechanically and chemically isolating the EL device from the stresses in the tire. A layer of foamed elastomeric material provides a suitable isolating material. The isolating material may have on one face an adhesive compatible with tire rubber mix and on an opposite face an adhesive compatible with a backing substrate (for example, the rubber patch) for the EL lamp. The isolating material advantageously isolates the EL lamp from some of the stresses the tire experiences in flexing during rolling. In addition, the isolating material acts as a barrier to oils and other compounds that may migrate out of the tire sidewall. A foamed elastomer is particularly useful for an EL lamp of the thin sheet form.

The portion of the tire on which the EL lamp or device package is mounted may be provided with a recess corresponding in shape to the patch or EL device package. The walls of the recess may be configured to contain or support the electronics.

According to another embodiment, the means for mounting the EL lamp to a tire relates to a wire EL lamp, and includes a narrow groove cut or formed in the tire to capture and retain the wire EL lamp. The wire may be held by an adhesive applied in the groove. Alternatively, the groove is formed in a c-shape with edges that overlap the open recess area of the groove to capture and retain the wire. Of course, adhesive could be also added to the c-shaped groove to assist in retaining the wire. The accompanying power storage device and control electronics may conveniently be integrated in a rubber patch, which may be attached to the tire.

The device according to the invention may be powered by a battery as the power storage device. According to one embodiment, the battery is of the type formed as a flat cell or cells, and is mounted between the EL lamp and the tire sidewall. For a wire EL lamp, the battery may be mounted to the tire in a suitable location and connected to the wire in an appropriate manner.

Alternatively, a power generating device such as is described in U.S. patent application Ser. No. 10/143,535, filed May 10, 2002, and assigned to the owner of the present invention, may be used. Such a device includes a piezoelectric fiber matrix that generates electric charge from mechanical strain.

A power generating device may include a rechargeable battery, a storage capacitor, or may work directly with the EL lamp.

According to one embodiment, the piezoelectric fiber matrix is mounted between the EL lamp and the tire sidewall, for example, in a rubber patch as described above. According to another embodiment, the piezoelectric fiber matrix is mounted separately to the tire sidewall and connected to the wire EL lamp.

A power generating device as described above is mounted to the tire at a location where it will experience strain during rotation of the tire. Possible locations include the tire sidewall and the crown. A rubber patch or EL assembly as described above are mounted to the tire sidewall where flexing occurs in the ground contacting portion of the tire.

According to another alternative, the power supply is mounted in the interior cavity of the tire, and the invention includes means for connecting the power supply to the EL lamp on the outer surface of the tire.

According to yet another alternative, the power generating device is an electromagnetic generator having wire coils mounted to the wheel rim and a magnet mounted to a stationary part of the vehicle.

BRIEF DESCRIPTION OF THE DRAWINGS

The invention will be better understood by reference to the following detailed description in conjunction with the appended drawings, in which.

DETAILED DESCRIPTION

Figure 1:
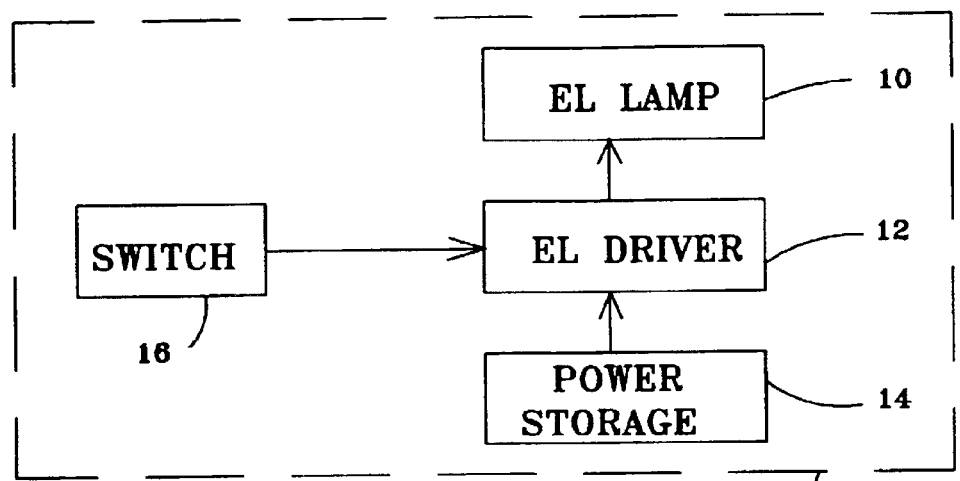
FIG. 1 is a schematic diagram of a basic configuration of an electroluminescent device in accordance with the invention.

An EL device for a tire in accordance with the invention, illustrated schematically in FIG. 1, includes an EL lamp 10, an EL driver 12, a power supply 14, an activator or switch device 16, and interface means 20 for mounting the device to a tire.

The interface means 20, as more fully described below, may include a patch on which the device is mounted, a recess or groove shaped to accept the device, a raised portion to accept the device, curing the device into the tire sidewall, an adhesive layer, or another suitable manner of interfacing the device with a tire.

Figure 2:
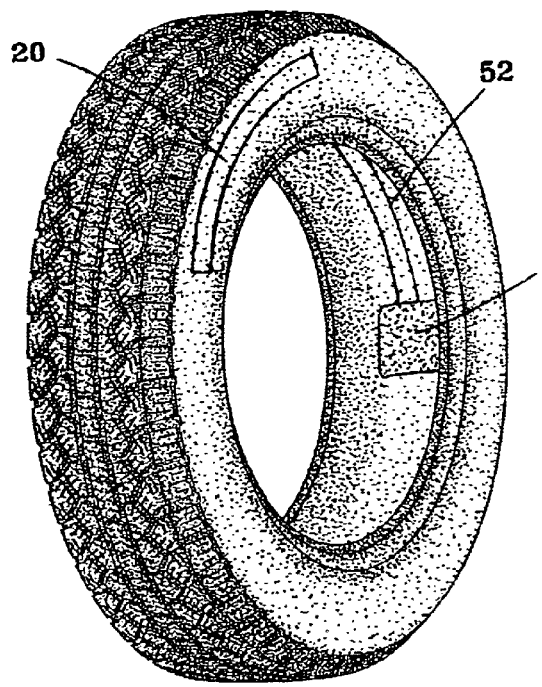
FIG. 2 illustrates a tire having an electroluminescent device in accordance with the invention.
Figure 3:
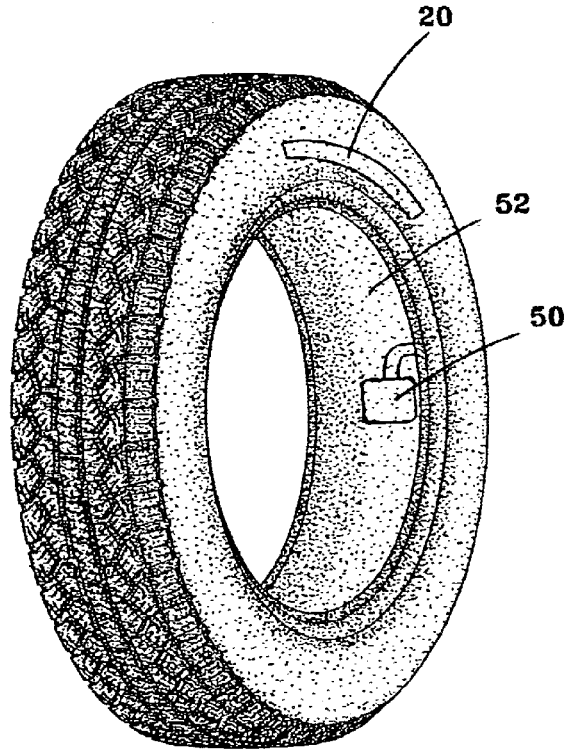
FIG. 3 illustrates a tire having an alternative electroluminescent device in accordance with the invention.

FIGS. 2 and 3 show two embodiments of electroluminescent devices for a tire. The device in FIG. 2 shows an electroluminescent (EL) lamp 10 of the flat panel type formed as a logo for the tire. Such flat panel EL lamps are very thin and flexible.

FIG. 3 shows a tire having a wire EL lamp 10, which is flexible and is shown bent in an attractive pattern. Such a wire can also be shaped as a logo or to spell out a name or trademark.

Although shown in an automobile tire, the device according to the invention may be incorporated also in bicycle tires, motorcycle tires, truck tires, or other vehicle tires. The invention can be used in an ornamental manner, as suggested by FIGS. 2 and 3. In addition, the invention can be used to help improve the visibility of vehicles in the dark, and as such, may be of particularly advantageous use on bicycles and emergency vehicles, for example.

The device according to the invention may be lighted continuously or may be pulsed for a flashing or strobe effect. Various configurations of the basic elements of the device in accordance with the invention are possible. A continuously lighted device may include a battery and a switch for activating the device. The switch may be manual (operated by the vehicle operator) or may be operated by sensing movement of the vehicle. Such a switch may be an accelerometer or a pressure or deflection sensing element mounted on the tire, for example, a piezoelectric device. Such a switch circuit may include a timer to shut the EL device off after a time period after detecting no movement of the tire.

Other configurations are also encompassed by the invention. The device may include a battery for power and a device to trigger pulses to the light the EL lamp in a flashing manner. The lamp may be made to flash at a particular frequency. Alternatively, the device can be made to flash in coordination with the rotation speed of the tire. For example, an accelerometer or piezoelectric device as mentioned above can sense rotations of the tire and act as the switch to trigger a flash once each rotation. For an EL lamp in a logo form, the flash may be timed for when the logo is at the top position in rotation to create an interesting effect. By coordinating the timing and duration of the pulse with the rotation speed of the tires, the EL lamp can be made to appear stationary at a selected point on the tire. The switch may accordingly be positioned on the tire relative to the position of the EL lamp to avoid the need for a timer. Alternatively, a microprocessor can be included, which can have a software timer function.

Figure 4:
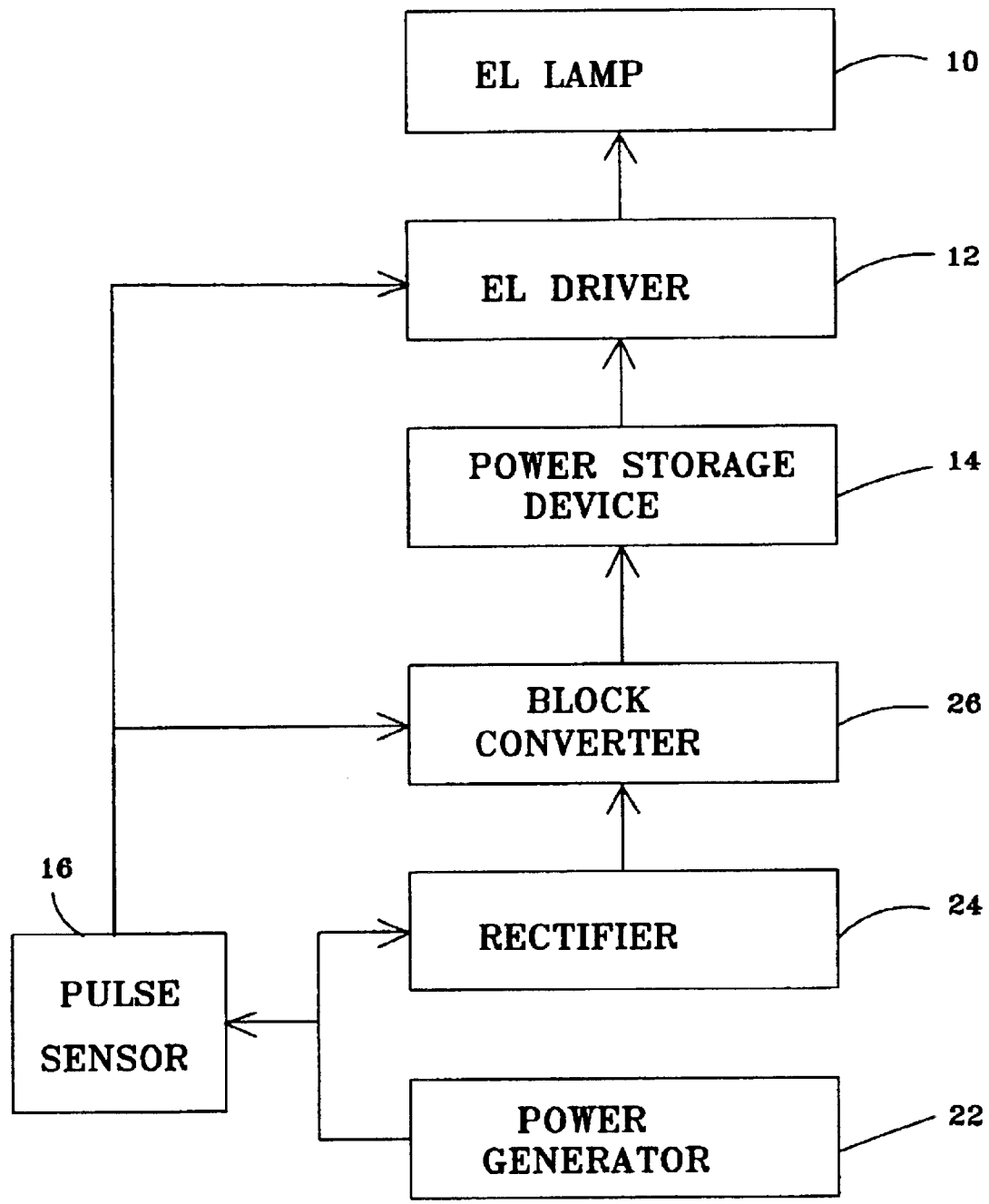
FIG. 4 is an alternative schematic diagram for an electroluminescent device in accordance with the invention.

An exemplary embodiment of the invention, shown schematically in FIG. 4, includes a piezoelectric power generator 22, such as that described in U.S. patent application Ser. No. 10/143,535, filed May 10, 2002, which is incorporated by reference for all it discloses. A charger, including a rectifier 24 and a buck converter 26, is connected to the piezoelectric generator 22 to charge a power storage device 14, a battery or storage capacitor, with energy from the piezoelectric generator. The piezoelectric generator or another sensor is used to trigger or activate the device by sending an enabling signal to a pulse sensor 16, which relays the signal to the EL driver 12, which in turn, activates the EL lamp 10. The pulse sensor 16 also sends an enabling signal to the buck converter 26 for sending power to the storage device 14. The storage device 14 may be any energy storage device, including a rechargeable battery or a storage capacitor, for example.

According to another aspect of this embodiment, activating or switching the EL lamp may be controlled by a microprocessor appropriately programmed for activating the EL driver.

In applications where small EL lamps or small power loads are required, the device may simply include a piezoelectric power generator directly connected to the EL driver and lamp.

According to yet another alternative, the power generating device is an electromagnetic generator having wire coils mounted to the wheel rim and a magnet mounted to a stationary part of the vehicle. The control device is mounted at a convenient location, and the electrical connection is made with the EL lamp by electrical conductors.

Figure 5:
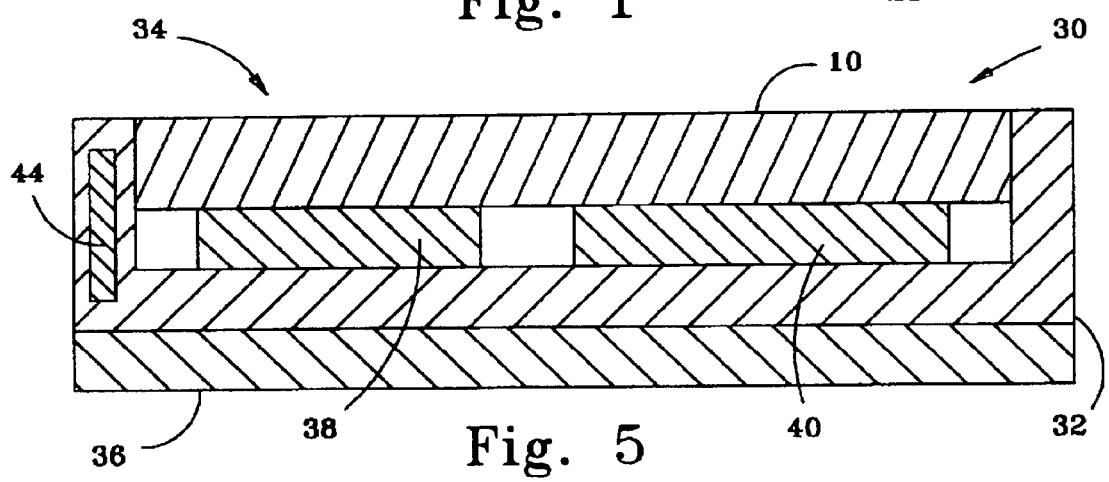
FIG. 5 is a section view of a containing and mounting device for a flat panel electroluminescent lamp; and, FIG. 6 is a section view of a mounting means for a wire electroluminescent lamp on a tire.

According to a preferred embodiment, the EL device may be integrated in a patch that may be applied to a tire sidewall. As shown in FIG. 5, the integrated patch assembly 30 includes a rubber patch 32. The patch includes a recess 34 on a front side to support and contain the EL device components. An adhesive 36 is disposed on a mounting surface of the rubber patch 32 to adhere the patch to a tire surface. The adhesive may be any adhesive capable of bonding rubber to rubber. The EL power components, which may include a battery 38 and a piezoelectric power generator 40, are positioned in the recess 34. The EL lamp 42 is positioned outward of the power components. The electronics 44 for controlling the EL lamp are conveniently cured into a portion of the patch 32, and appropriate electrical connections may be made.

According to another aspect, the EL device may include a flat battery and trigger device attached to a back side of the EL lamp to form a package or assembly.

According to another aspect of the invention, the battery is removable for recharging. Compatible with the embodiments just described, and referring to FIG. 5, the EL lamp 10 and battery 38 would be removable from the patch 32. The EL lamp 10 and battery 38 could be formed as a package that may be removed, or these components may be separately removable. A recharging device would be needed. The patch may include mechanical means to retain the EL lamp and battery package, such as clips, a tongue-and-groove arrangement, or other suitable means. Alternatively, other means, such as an adhesive, could be used to retain the EL lamp and battery package.

The patch or package assembly may have a layer of an isolating material between the patch or package and the tire sidewall. The isolating material preferably has an adhesive compatible with tire rubber material on one face for mounting on the tire sidewall. The isolating material helps prevent stresses from being transmitted from the rotating tire to the EL device components, and helps prevent oils and other compounds from migrating from the tire to the EL device. A foamed elastomeric material provides a suitable isolating material.

The portion of the tire on which the patch 30 or package assembly is mounted may be provided with a recess corresponding in shape to the assembly. Alternatively, the tire may be provided with a raised area to accept the patch or package assembly.

The device may be cured directly in the tire sidewall in a space open externally to expose the EL lamp. A coating of epoxy or other material may be applied to the electrical components for protection when cured to the tire and to isolate the components from the tire rubber materials. In addition, the EL device may first be installed in a rubber supporting and integrating structure, similar to the patch 32 described in connection with FIG. 5, to ensure that the device cures properly to the sidewall.

According to another aspect of the invention, the EL lamp may be mounted separately from the other electronic components, in particular the power generating components, to take advantage of the tire's functional characteristics. As seen in FIG. 3, a power generating device or rotation sensor 50 may be mounted to an inner surface of the tire. This embodiment includes means 52 for conducting the power from the interiorly located power device to the externally located EL lamp. The connection may simply be wire conductors cured in place and extending through the tire sidewall. An alternative is a conductive element positioned where it can be contacted from the interior power generating components and the exterior EL lamp. An example may be a portion of the tire sidewall rubber doped with conductive material, to which interior and exterior connections may be made.

Figure 6:
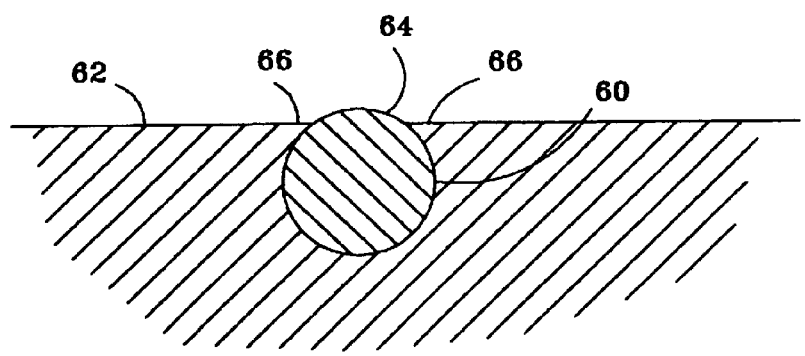

According to another embodiment, illustrated in FIG. 6, the means for mounting the EL lamp to a tire includes a narrow groove 60 cut or formed in the tire sidewall 62 to capture and retain a wire EL lamp 64. The wire 64 may be held by an adhesive (not illustrated) applied in the groove 60. Alternatively, the groove 60 is formed in a c-shape with edges 66 that overlap the open recess area of the groove to capture and retain the wire 64. Of course, adhesive could be added to the c-shaped groove to assist in retaining the wire. Advantageously, the adhesive layer could include an isolating material, such as a foamed elastomer, to help protect the wire lamp. The wire 64 may also be cured in place in such a groove.

The electronic control and power devices as described above are provided for the EL wire lamp device. The control and power supply could be located as convenient, for example, in the tire or on a patch located on the outer surface of the tire sidewall, with appropriate connection.

What is claimed is:

1. A tire comprising a flexible sidewall and an electroluminescent device, wherein the electroluminescent device comprising:

an electroluminescent lamp;

a power source for the electroluminescent lamp;

a control device; and, interface means mounting the electroluminescent lamp on the sidewall of the tire while mechanically and chemically isolating the electroluminescent lamp from the sidewall.

2. The tire according to claim 1, wherein the electroluminescent lamp is a flat panel.

3. The tire according to claim 2, wherein the interface means includes a foam layer having an adhesive for bonding with rubber on one face and an adhesive for bonding with the flat panel on an opposite face.

4. The tire according to claim 2, wherein the interface means includes a rubber patch for supporting the electroluminescent lamp, the power source and the control device.

5. The tire according to claim 1, wherein the electroluminescent lamp is a wire.

6. The tire according to claim 5, wherein the interface means is a groove formed in the tire.

7. The tire according to claim 1, wherein the interface means includes curing the electroluminescent lamp, the control device and the power source to the tire sidewall.

8. The tire according to claim 1, wherein the power source is a battery.

9. The tire according to claim 1, wherein the power source is a piezoelectric generator.

10. The tire according to claim 1, wherein the power source is a battery having a piezoelectric generator recharger.

11. The tire according to claim 1, wherein the power source is an electromagnetic generator.

12. The tire according to claim 1, wherein the power source is mounted in a cavity of the tire and further comprising means for connecting the power source to the electroluminescent lamp.

13. The device according to claim 12, wherein said means for connecting the power source to the electroluminescent lamp comprises a conductor.

14. The tire according to claim 1, wherein the control device includes means for energizing the electroluminescent lamp to flash.

15. The tire according to claim 14, wherein the means for energizing includes means for coordinating timing and duration of an energizing pulse to create a strobe effect.

* * * * *